Sept. 17, 1968    T. E. C. KNEE    3,402,227
PROCESS FOR PREPARATION OF NONWOVEN WEBS
Filed Jan. 26, 1965    6 Sheets-Sheet 1

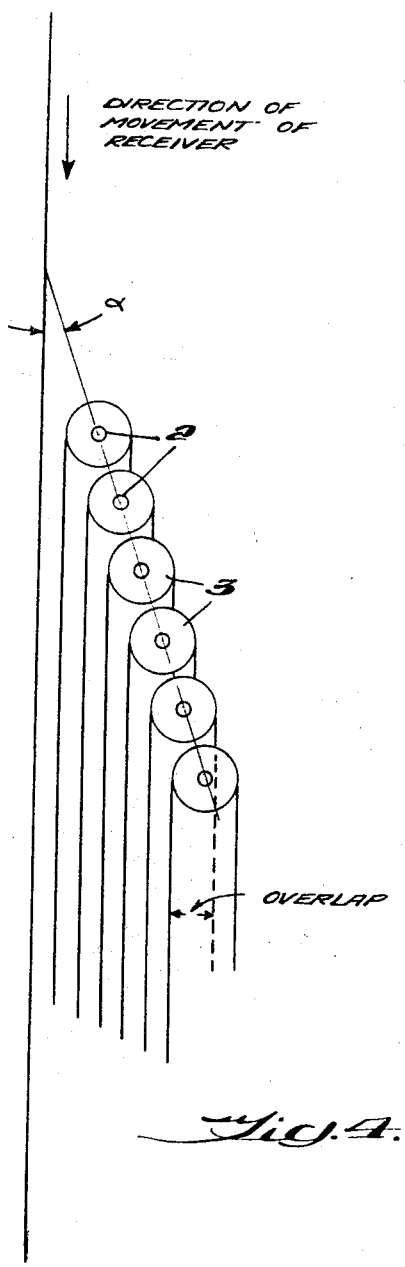
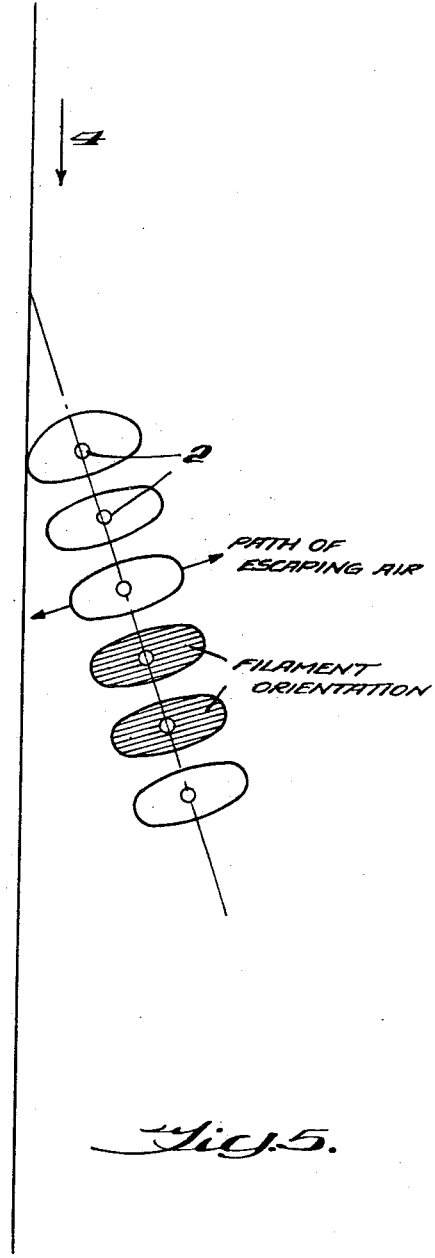

Sept. 17, 1968  T. E. C. KNEE  3,402,227
PROCESS FOR PREPARATION OF NONWOVEN WEBS
Filed Jan. 25, 1965  6 Sheets-Sheet 4
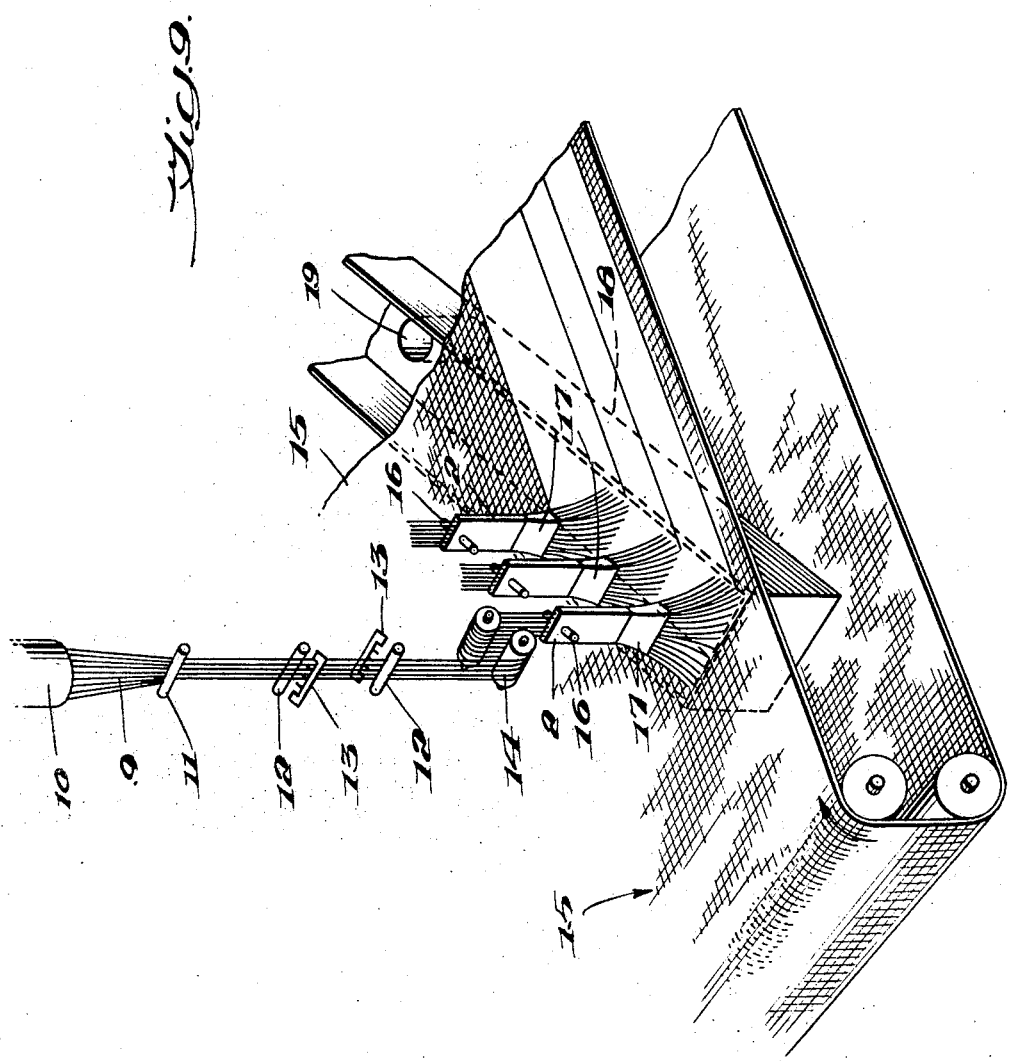

Sept. 17, 1968  T. E. C. KNEE  3,402,227
PROCESS FOR PREPARATION OF NONWOVEN WEBS
Filed Jan. 25, 1965  6 Sheets-Sheet 5
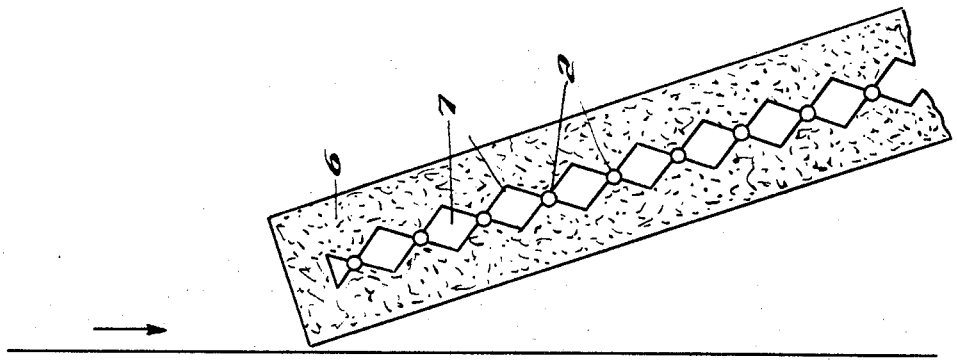
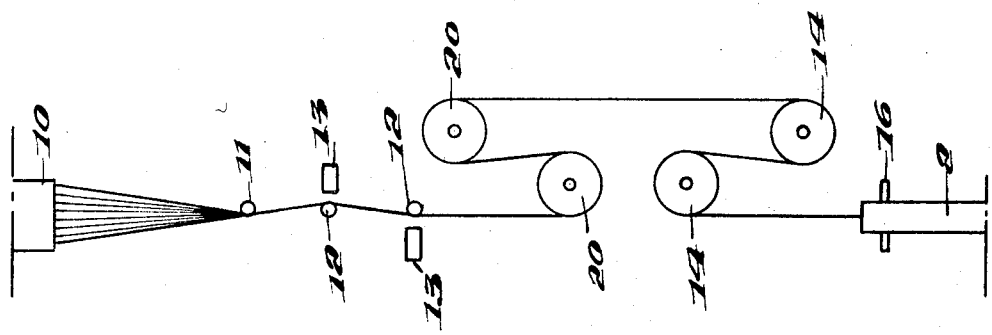
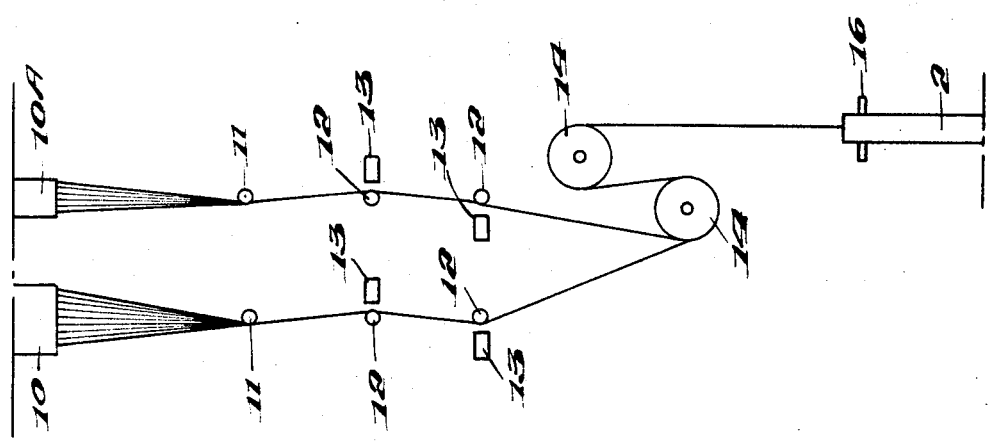

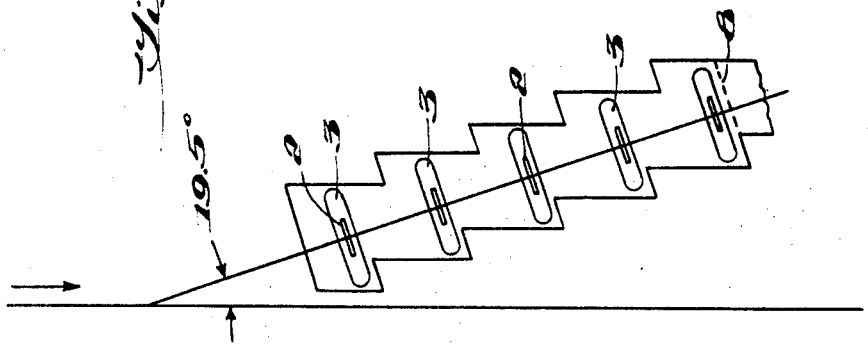
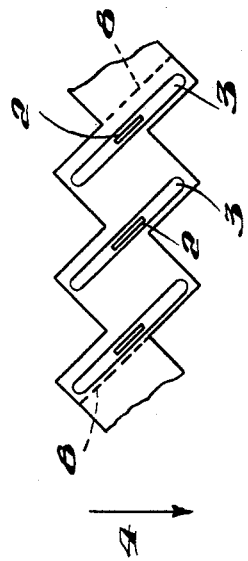

United States Patent Office 3,402,227
Patented Sept. 17, 1968

3,402,227
PROCESS FOR PREPARATION OF
NONWOVEN WEBS
Terence E. C. Knee, Hendersonville, Tenn., assignor to
to E. I. du Pont de Nemours and Company, Wilmington, Del., a corporation of Delaware
Filed Jan. 25, 1965, Ser. No. 427,834
20 Claims. (Cl. 264—24)

ABSTRACT OF THE DISCLOSURE

A process for the preparation of nonwoven webs from continuous filaments wherein ribbons of electrostatically charged filaments exiting from stationary jet devices are laid down on a moving receiver with an overlap in the range of from 50–80% for slot jets and 67–80% for round jets between laterally adjacent ribbons. An amount of suction air corresponding to at least five times the total amount of jet air is withdrawn through the receiver.

---

This invention relates to nonwoven webs, in particular to a commercially attractive process for the manufacture of continuous-filament nonwoven webs having uniform thickness and properties throughout, and more particularly to the preparation of such webs in wide widths.

In the adaptation of the recently-developed process for the preparation of continuous-filament nonwoven webs, described in British Patent 932,482, to economical commercial production of wide nonwoven webs, one problem is that of distribution of a group of electrostatically-charged, individually-separated filaments over a suitable collecting surface. This problem is complicated by the fact that the need for wide webs, for example, those up to 15 feet (4.6 m.) wide or more, requires that the output of filaments from a plurality of spinnerets or other filament-producing devices be combined. The electrostatic charge that is applied to the filaments to cause them to separate and thus permit the collection of a non-blotchy nonwoven web which is essentially free from aggregates of filaments, has been found to cause interference between the adjacent outputs and thereby prevents them from being combined uniformly.

The forwarding of the electrostatically-charged filaments toward the collecting surface in the above-described process is preferably accomplished by means of jet devices which utilize a high-velocity stream of air flowing cocurrently with the filaments through the jet device to provide the necessary forwarding tension. Jet devices are preferred for this purpose because the tension on the filaments is rapidly released as the filaments exit from the jet and, therefore, they are free to separate due to the applied electrostatic charge. Air streams exiting from the jets, however, have been found to interfere with the uniform combination of filaments from adjacent jets. Thus both the electrostatic charge which is required to obtain non-blotchy webs with good filament separation and the jet devices, which are preferred for forwarding filaments, are responsible for difficulties in obtaining the uniform blending of strands of filaments which is required to prepare wide webs economically.

One approach to overcome these difficulties involves maintaining the jet devices stationary and aerodynamically diverting the high-velocity streams of air and the strands of electrostatically-charged filaments exiting from the jets by means of air-foil devices which are mechanically oscillated or rotated. By proper synchronization of these air-foil diversion elements, adjacent air streams and the filaments contained therein are maintained in a spaced relationship and, therefore, do not disturb each other. As the air-foil devices rotate or oscillate, the filaments from adjacent jets form overlapping layers on the collecting device and a uniform web can be formed. While this method is capable of producing wide webs at a considerably more rapid rate than is possible with a single jet traversing a web-collection device, it is limited in productivity because of mechanical limitations on the frequency at which the air-foil devices can be oscillated or rotated.

In addition to the mechanical limitations on the frequency of oscillation or rotation of air-foil devices, another factor which limits production rates is the inability of the air-foil devices to divert the entire filament strand when high filament counts, that is 250 to 1000 per jet device, are used in round jets.

Combined aerodynamic and mechanical diversion of the air streams and the contained filaments can be utilized, but in general these suffer from the same mechanical limitations as are encountered with aerodynamic diversion alone. In addition it has been found that contact of electrostatically-charged filaments with solid surfaces prior to web laydown tends to cause aggregation of the filaments and thus form undesirable bunches of filaments in the nonwoven web. This is particularly acute when heat-relaxation of poly(ethylene terephthalate) filaments to produce spontaneously-elongatable fibers as disclosed in Kitson and Reese U.S. Patent 2,952,879, is effected in the jet device. The hot filaments are found to fuse and form bunches when they are deflected against a solid surface.

One purpose of this invention is to provide a process for the production of uniform, continuous-filament nonwoven webs of wide widths.

Another purpose is to provide a process which is suitable for the high-speed manufacture of continuous-filament nonwoven webs.

A further purpose is to provide a process which requires no moving parts in the filament-distribution system thereby minimizing mechanical complexities and increasing operating dependability.

A still further purpose is to provide a process for the production of wide, isotropic nonwoven webs which have uniform weight and properties throughout.

An additional purpose is to provide a process for the production of wide nonwoven webs which are substantially free of aggregates of filaments and which present a non-blotchy appearance.

These and other purposes are attained in accordance with this invention by providing a plurality of substantially untwisted multifilament strands of continuous filaments, applying an electrostatic charge to the filaments, then forwarding the strands by means of high-velocity streams of air in stationary jet devices toward a movable foraminous web-laydown receiver. A stationary suction means for example, a suction chamber, is positioned below the foraminous receiver to remove air therethrough. An amount of air corresponding to at least 5 times the total amount of air in the high-velocity streams of air is withdrawn through the receiver by the suction means. The air stream from each jet and the filaments contained therein are directed perpendicularly toward the receiver at a location above the suction means. Since the jet devices are stationary, the filaments of each stream initially form a discrete area of filament deposition above the suction means. However, in cooperation with the movement of the receiver, the filaments contained in the streams are laid down on the receiver as ribbons, each of which overlaps each laterally-adjacent ribbon by 50 to 80%. The overlapping ribbons of continuous filaments constitute the desired nonwoven web.

The above-specified conditions are responsible for uniformity of web weight in both the lateral and machine directions of the nonwoven web.

Nonuniformities in the lateral direction will appear as streaks in the machine direction. By uniformity of web weight is meant that the coefficient of variation of web weight from the average is less than 12%, at a web weight of 2.5 oz./yd.$^2$ (85 g./m.$^2$) as determined by weighing at least ten 1" x 6.5" (2.5 cm. x 16.5 cm.) samples of the web. At a web weight of 1 oz./yd.$^2$ (34 g./m.$^2$), the coefficient of variation is less than 15%, and at 4 oz./yd.$^2$ (136 g./m.$^2$), less than 10%.

The required amount of overlap of adjacent areas is obtained by positioning the jets so that their lateral spacing is sufficiently close to give the desired overlap. The effect of aerodynamic and electrostatic interference between closely adjacent jets must be avoided in order to obtain undistorted areas of deposition from each jet and to minimize directionality of filament-laydown within the areas which would lead to anisotropic webs. Since the lateral spacing of the jets must be close to obtain the desired overlap, spacing in the machine direction, that is along the direction of movement of the receiver, can be used to provide sufficient separation between the jets. To avoid interference completely, however, the jets would have to be three feet (92 cm.) or more apart depending on the type of jet used. This is impractical because it would require an extremely long laydown-zone to make wide webs.

In accordance with this invention, spacing between jets in the machine direction necessary to overcome the interference between the jets can be minimized by withdrawal of a specified amount of air through the receiver in the web-laydown zone. Thus, adjustment of the amount of air removed and the design of the suction means below the web-laydown receiver, has been found to eliminate the interference between adjacent jets to an extent which permits the filaments from each jet to be laid down in a discrete area of deposition of essentially the same shape as would be obtained from a single isolated jet. Moreover, the filaments do not have any preferential orientation within the areas. Under these conditions the output from a jet having a circular cross section will form a circular area of deposition, and that from a jet having a rectangular cross section of high aspect ratio (ratio of length to the height of the rectangle) will form a flattened ellipsoidal area of deposition. However, withdrawal of air does not provide for intermingling between filaments exiting from adjacent jets before web laydown, and accordingly the jets are positioned so that individual areas of deposition are formed. As the receiver is moved, these areas form ribbons which overlap to form the nonwoven web.

The precise arrangement chosen for the jets in the machine direction will depend on the shape and size of the individual areas of deposition. Round jets may be placed in a single line which forms an acute angle with the direction of movement of the receiver, the actual angle being dependent upon the size of the areas of deposition and the spacial requirements of the jets and associated filament-forming, drawing, and electrostatic-charging means. Round jets may also be placed in a series of lines, for example, 3 or 4, which are perpendicular to the direction of movement of the receiver. In this case, as the receiver is moved, the areas deposited from the second line of jets overlap those from the first line; those from the third line overlap those from the first and second; and so forth. The above arrangements can also be used with slots jets, that is, those with a rectangular cross section. However, because it is possible to obtain with slot jets an elongated area of deposition in which the filaments retain an isotropic distribution, an alternative arrangement can be used with slot jets. In this arrangement the jets are placed on a line perpendicular to the direction of movement of the receiver and are so oriented that the long dimension of the slot is at an angle with the direction of movement of the receiver. The amount of overlap is determined by the length of the elongated areas of deposition, the angle that they make with the direction of movement of the receiver, and the spacing between the jets.

It has been found that the ribbons of deposited filaments obtained from slot jets can be more easily blended into uniform webs than those obtained from round jets and thus a lower amount of overlap between laterally-adjacent ribbons is required. An overlap of 50% can be used with slot jets while a minimum overlap of 67% is required with round jets. The profile of the area of deposition from a slot jet is uniform over a considerable width. Therefore, in order to obtain uniform thickness, each portion of the web should be formed from an integral number, 2 or greater, of layers when slot jets are used and overlaps of 50%, 67%, 75% and 80% are employed. Because of the gaussian distribution obtained with round jets, any level of overlap between 67 and 80% is suitable when round jets are used. With both types of jets withdrawal of air through the laydown receiver is required to obtain isotropic nonwoven webs.

The invention will be further understood by reference to the following drawings in which:

FIGURE 4 is a plan view of the ideal shape of the areas of deposition being laid down on a moving receiver from a series of round jets placed along a single line which forms an acute angle with the direction of movement of the receiver;

FIGURE 5 is a plan view of the actual shape of the areas of deposition obtained from a series of round jets as in FIGURE 4, when the electrostatic repulsion and aerodynamic interference between the outputs from laterally-adjacent jets are permitted to influence the laydown patterns;

Figure 6:
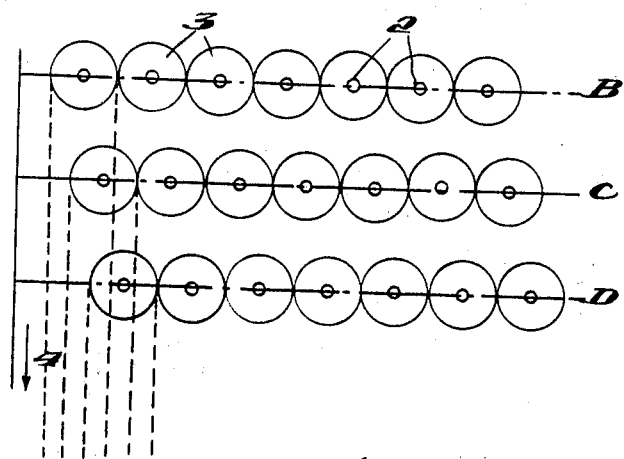
FIGURES 6 and 7 are plan views of areas of deposition from alternative arrangements of round jets in series of lines which are perpendicular to the direction of movement of the receiver.
Figure 6A:
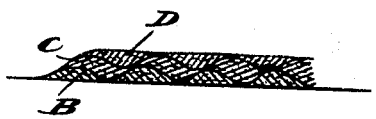
Figure 7:
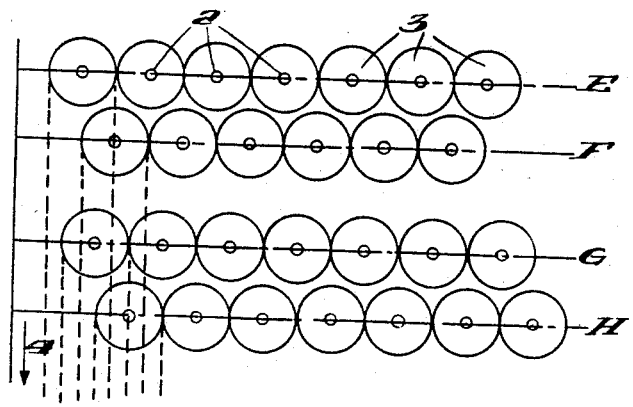
Figure 7A:
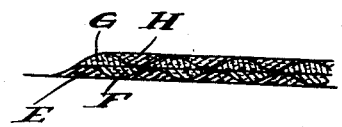
Figure 8:
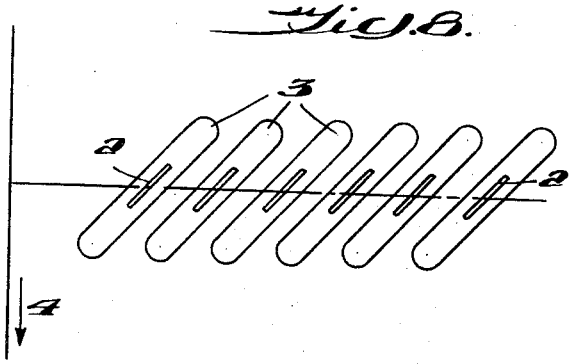
FIGURE 8 is a plan view of an arrangement of the elongated areas of deposition obtainable with slot jets.
Figure 8A:

FIGURES 6A, 7A, and 8A are schematic representations of the cross sections of the nonwoven webs obtainable from the jet arrangements shown in FIGURES 6, 7, and 8, respectively;

FIGURE 9 is an isometric view showing apparatus embodiments suitable for carrying out the process of this invention;

FIGURES 10 and 11 are schematic representations of alternative filament-spinning and drawing procedures which can be utilized in conjunction with the process of this invention;

FIGURE 12 is a plan view of a preferred suction pattern for use with the angle arrangement of round jets shown in FIGURE 4;

FIGURE 13 is a plan view of a preferred suction pattern for slot jets positioned with their mid-points on a line perpendicular to the direction of movement of the receiver and with the long dimension of the slots placed at an angle of 45° with the direction of movement of the receiver; and FIGURE 14 is a plan view of a preferred suction pattern for slot jets positioned with their midpoints on a line which makes an angle of 19.5° with the direction of movement of the receiver and with the long dimension of the slots perpendicular to the line.

In all of these figures and throughout the ensuing discussion, the same reference numerals are used for similar parts.

Figure 1:
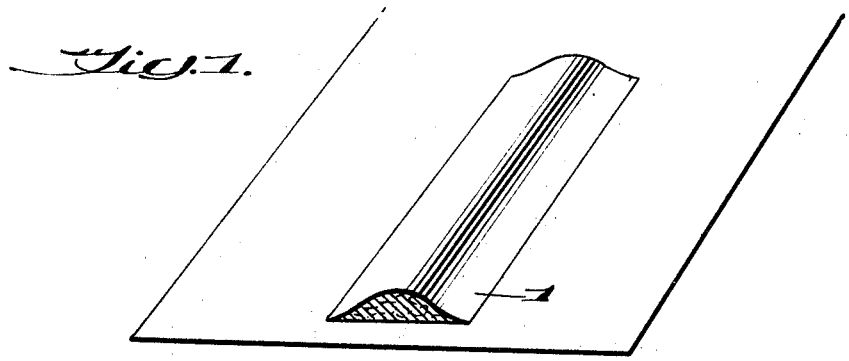
FIGURE 1 is an isometric representation of the profile of an area of deposition of filaments from a single stationary round jet onto a moving web-laydown receiver.
Figure 3:
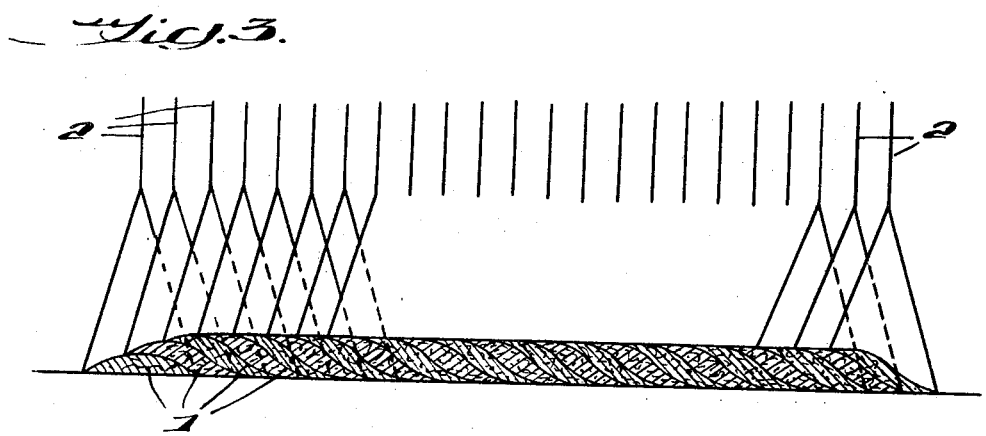
FIGURE 3 is a schematic representation of the cross section of a nonwoven web obtained from a series of stationary round jets so positioned that the outputs therefrom form discrete areas of deposition which form overlapping ribbons on a moving web-laydown receiver.

In FIGURE 1, the typical gaussian distribution of filaments exiting from a round jet is shown in profile, with the thickness of the profile (height of the distribution) being exaggerated to accentuate the character of the distribution. The web-ribbon obtained by movement of the receiver, and illustrated in FIGURE 1, can be blended with ribbons of the same type to provide a nonwoven web of uniform web weight in the transverse direction (perpendicular to the direction of movement of the receiver) provided the laterally-adjacent ribbons overlap by at least 67%. This is indicated schematically in FIGURE 3 where the overlapping of ribbons 1, each of which represents the output from an individual jet 2, is shown in a cross section of the nonwoven web, the cross section being in the transverse direction. With the gaussian distribution obtained from round jets, an overlap of appreciably less than 67%, for example, 50–60%, is not capable of giving a web with uniform weight in the transverse direction. A web having a cross section indicated schematically in FIGURE 3 is obtained with the arrangement of round jets shown in FIGURE 4, where the jets 2 are in a single line or block which makes an acute angle α with the direction of movement of the receiver. Circular areas of deposition 3 shown in FIGURE 4, are obtained with round jets. Where the diameters of such circular areas of deposition are about the same as the space between the jets, the required amount of overlap between laterally-adjacent areas is obtained when α is 19.5°.

FIGURE 6 illustrates an alternative arrangement of round jets which gives a 67% overlap between laterally-adjacent circular areas of deposition 3. In this arrangement the jets are in a series of lines B, C, and D which are perpendicular to the direction of movement of the receiver indicated by the arrow 4. The web cross section in this case differs from that in FIGURE 4 and is shown in FIGURE 6A, where B indicates a typical ribbon cross section from the jets in line B; C, a typical ribbon cross section from the jets in line C; and D, a typical ribbon cross section from the jets in line D.

FIGURE 7 illustrates an arrangement of round jets similar to that in FIGURE 6 except that four lines or blocks of jets are used and the overlap between laterally-adjacent areas of deposition is 75%. The web profile obtained from this arrangement is shown schematically in FIGURE 7A where the letters E, F, G, and H indicate typical ribbon cross sections from jets in the corresponding lines or blocks of jets.

An overlapping of laterally-adjacent areas of deposition of greater than 80% is not used since it is not required to obtain an acceptable level of web uniformity. Moreover, a higher amount of overlapping is economically unattractive since it inherently requires a larger number of jet devices and associated filament-forming, drawing, charging and guidance means. In addition, the amount of trimming required to remove the low-basis-weight edges of the web increases as the amount of overlap increases. Thus assuming that web profiles having a rectangular cross section are blended by overlapping, with 50% overlap the total amount of trimming from both edges required to leave uniform, usable web is equivalent to the output from one jet. With 67% overlap the amount of web trimmed from both edges corresponds to the output from two jets; with 75% overlap, the amount corresponds to the output from three jets; and with 80% overlap, the amount corresponds to the output from four jets. It is possible by means of aerodynamic and/or electrostatic guidance of the filaments forming the edges of the nonwoven web, or by modified designs of the end jet devices and/or diffusers, to minimize the differences between the edges and the remainder of the web. This becomes increasingly difficult, however, as the number of jets contributing to the edges increases.

Figure 2:
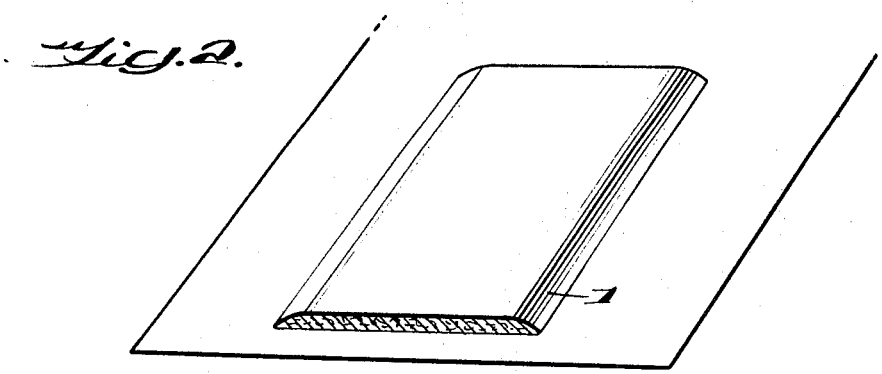
FIGURE 2 is an isometric representation as in FIGURE 1 of an area of deposition obtained from a single stationary slot jet.

In FIGURE 2 the distribution of filaments exiting from a slot jet of high aspect ratio is shown in profile. The wide flat ribbon 1 obtained by movement of the receiver is so readily blended with similar ribbons that an overlap of 50% gives webs having a uniform weight in the transverse direction. One arrangement of jets capable of giving this degree of overlap is illustrated in FIGURE 8 where the flattened ellipsoidal areas of deposition 3 obtained from slot jets 2 are shown. In this arrangement the midpoints of the slot jets are in a line or block which is perpendicular to the direction of movement of the receiver while the long dimensions of the slots are at an angle of 45° with the direction of movement of the receiver. The cross section of a nonwoven web obtained from this arrangement of slot jets is schematically illustated in FIGURE 8A. Other arrangements of slot jets which will give the required 50, 67, 75 or 80% overlap of laterally-adjacent areas of deposition will be readily apparent and accordingly, except for the embodiment shown in FIGURES 9 and 14, further specific arrangements will not be illustated herein.

The areas of deposition in FIGURES 4, 6, 7, and 8 have been represented as circles and flattened ellipses, which are the natural and ideal shapes obtained from isolated round and slot jets respectively. The jets in these figures are not isolated, however, and due to their proximity to each other the areas of deposition are distorted by the electrostatic forces of repulsion between the filaments exiting from neighboring jets and the aerodynamic interference between adjacent air streams. The aerodynamic interference causes most of the jet air to escape in a direction perpendicular to the plane of the jets. The actual distortion of areas of deposition obtained from round jets under such conditions is illustrated in FIGURE 5 where the areas of deposition are shown as ellipses with their major axes perpendicular to the line of jets. The areas of deposition from adjacent slot jets are likewise distorted from the normal pattern obtained with an isolated jet. It has been found that any distortion from the natural laydown pattern results in filament orientation, and consequently directionality in both tensile strength and modulus of the nonwoven web is observed after bonding. With such directional bonded webs, ratios of tensile strength as high as 2/1 and corresponding ratios for tensile modulus of 4/1 have been obtained in directions 90° apart.

It has been found that the areas of deposition can be converted to their normal shape, as shown in FIGURE 3, and the directionality in tensile strength of the bonded web markedly improved to a 1/1 ratio of tensile strength in the machine and transverse directions, if so desired, by withdrawal of air through the receiver into a suction chamber placed below the receiver in a position under the line(s) of jets. To obtain these results, withdrawal of an amount of air corresponding to at least 5 times the total amount of air in the high-velocity streams of air exiting from the jet devices is required. Larger quantities of air, for example, 20 to 30 times the total jet air, can be withdrawn but this is normally avoided because of the cost of moving these quantities of air.

Most efficient use of suction air can be obtained by adjusting the pattern of the suction areas. This may be accomplished by suitable design of the suction chamber including the use of baffles or, as exemplified in FIGURE 12, by use of an air-pervious web structure 6 with cut-out areas 7. In addition to lower suction-air requirements, such patterning permits greater regulation of the shape of the areas of deposition and particularly the orientation of the filaments therein. While the use of an adequate amount of suction air alone can overcome the tensile-strength directionality in the nonwoven web, the tensile-modulus directionality is not eliminated completely. It can be overcome, however, with web laydown from round jets, positioned as in FIGURES 3 and 4, by the suction pattern shown in FIGURE 12. In this pattern, air is preferentially removed at points midway between the vertical axes of laterally adjacent jets. Diamond-shaped cut-out areas are found to be especially effective. In addition it is desirable to grade into the areas of intense suction by surrounding the cut-outs with an area of less intense suction. This can be readily achieved by cutting the pattern from a porous material such as a woven or nonwoven fabric.

FIGURE 13 illustrates a typical suction pattern designed for use with slot jets 2 positioned with their centers on a line perpendicular to the direction of movement of the receiver, indicated by the arrow 4, and with the long dimensions of the slots at an angle of 45° with the direction of movement of the receiver. It will be noted that the laterally-spaced areas of deposition 3 from this single line of slot jets do not overlap each other, and accordingly, this arrangement by itself will not give a uniform nonwoven web. This arrangement is suitable, however, for use in a series of lines of jets such as indicated in FIGURES 6 and 7 for round jets. In the type of suction pattern illustrated in FIGURE 13, the size of the rectangular pattern under each jet is dependent on the dimensions of the areas of deposition. It has been found that best results are attained when each area of deposition falls on or near the trailing edge of the pattern as shown in FIGURE 13. This allows most of the air entering the pattern to be used to pin the filaments and helps to prevent the web from blowing-up as it leaves the suction area. This blowing-up may be caused by air entering the suction area from the downstream side of the laydown zone. As the suction is increased in the laydown zone, there is also a greater tendency for the web to blow-up, but this can be eliminated by providing a gradient of suction at the trailing edge of the pattern. This may be accomplished by proper design of the cut-out areas or by introducing a layer of a porous woven or nonwoven fabric at the trailing side of the suction area. The dotted lines 8 in FIGURE 13 indicate the design of the suction pattern used below the terminal jets in the line of jets. FIGURE 14 illustrates a preferred suction pattern for an alternative arrangement of slot jets following the principles outlined herein in the discussion of FIGURE 13.

The suction area directly under each jet should range from about 2 to 5 times the area of filament deposition from that jet and the air should be withdrawn through the belt in that suction area at a rate that is at least 5 times as great as the flow of air from the jet.

FIGURE 9 shows the essential parts of an apparatus suitable for carrying out the process of this invention. For clarity only a single filament-spinning position, including the charging and drawing means, and only three filament-forwarding jet devices are shown. The additional spinning positions and jet devices are identical to those shown and are provided in the numbers required to produce the desired width of nonwoven web. In FIGURE 9, filaments 9 are extruded from spinneret 10 and combined into a strand on snub bar 11. Snub bar 11 may be cylindrical as shown or may have convex or concave surface to cause divergence or convergence of the filament strand, respectively. Alternatively, a comb device may be used in place of the snub bar 11 to regulate the width of the filament strand and maintain it in the desired alignment with the draw rolls and jet devices downstream therefrom. The filament strand is then electrostatically charged by means of corona discharge devices comprising target bars 12 and charge heads 13. The filament strand is passed into light contact with slowly rotating target bars 12 which are positioned adjacent charge heads 13 which have needle electrodes. A corona discharge is generated by applying a high electric potential to the electrodes and grounding the target bars.

The charged filaments then pass over draw rolls 14 and then into stationary slot jets 2 which strip the filaments from the last draw roll and forward them toward the web-laydown receiver 15. The slot jets are provided with air through inlets 16. If poly(ethylene terephthalate) filaments are being processed, hot air may be supplied to the jets through inlets 16 to heat-relax the filaments as they pass through the jets and thereby develop the property of spontaneous elongation. The jet devices are equipped with diffuser sections 17 to spread the filament strands and provide elongated areas of deposition which can be easily blended into a uniform nonwoven web.

The filaments are collected on moving foraminous receiver 15 above the suction chamber 18. Air is withdrawn through the receiver into the suction chamber and then through exhaust duct 19. The receiver is preferably a metal screen and is grounded, thereby utilizing electrostatic attraction forces to attract and hold the charged filaments to the receiver. The air withdrawn through the receiver serves to overcome the aerodynamic and electrostatic interference between laterally-adjacent jets. Thus, it controls each stream of filaments moving between the jets and the receiver thereby preventing preferential orientation of filaments in any parallel plane intersecting the stream of filaments and it also helps to eliminate the disrupting influences of the charges and entrained air in the filament streams from adjacent jets.

FIGURE 10 illustrates the co-spinning of two types of filaments and then combining them before they are deposited in the form of a nonwoven web. This method is highly useful for cospinning binder filaments with the matrix filaments of the nonwoven web. For example poly (ethylene terephthalate) filaments may be spun from spinneret 10 and an 80/20 poly(ethylene terephthalate)/poly (ethylene isophthalate) copolyester spun from spinneret 10A, the copolyester serving as the binder. In this case the two snub bars 11 can be used as filament guides to equalize the width of the two filament strands. Since the matrix filaments are present in the greater number, that filament strand is wider and accordingly a filament guide with a concave surface is used to converge the strand, while a guide with a convex surface is used to diverge the strand of binder filaments. After separate charging of the filaments by corona discharge devices, the two strands are combined at the first draw roll to give a single strand with the binder filaments distributed uniformly therethrough. This arrangement of the filaments is desired since it assists in obtaining a uniform distribution of the binder filaments throughout the nonwoven web.

FIGURE 11 illustrates a roll-drawing operation for attenuation of the filaments instead of the spindrawing method illustrated in FIGURES 9 and 10. In the roll-drawing method, the filaments pass over feed rolls 20, which may be heated, and then over draw rolls 14 which are running at a more rapid surface speed than the feed rolls. It is also possible to effect two-stage drawing by running the second feed roll at a slightly faster speed than the first feed roll. These methods are especially useful in the spinning of isotactic polypropylene filaments.

After laydown of the nonwoven web by the process of this invention, the web may be consolidated by passing into the nip between heated rolls, then optionally embossed to provide a decorative or functional surface pattern and then bonded. For example, a nonwoven web of poly(ethylene terephthalate) filaments containing 15% by weight of binder filaments composed of an 80/20 copolyester of poly(ethylene terephthalate/poly(ethylene isophthalate/poly(ethylene isophthalate), can be consolidated by passing between a belt and heated drum at a temperature of 100–140° C., embossed by passing between patterned rolls heated at 150–180° C., and then bonded by passing hot air at 200–230° C. through the web as it is maintained under restraint between a pair of foraminous belts. Webs of polypropylene filaments may be bonded by contact with a saturated steam atmosphere at about 140–165° C., while the web is maintained under compressional restraint to prevent filament shrinkage. An alternative bonding technique for polypropylene webs involves simultaneous embossing and bonding by passing the web between heated embossing rolls. The bonded nonwoven sheets obtained by these methods are useful in a variety of applications including tenting substrates, window shades, bookbinding substrates, interliners for apparel, shoe fabrics, primary and secondary backings for tufted carpets, and foundation sheetings.

Example I

This example illustrates the effect of percent overlap on web uniformity.

Four round jets are placed in line with 4 in. (10.2 cm.) between adjacent jets. Poly(ethylene terephthalate) filaments are spun from a spinneret with 288 holes at a total throughput of 27 lbs. (12.3 kg.) of polymer per hour. The output from the spinneret is divided into four 72-filament strands and a strand is directed into each of the jets. Each jet is supplied with 3.8 s.c.f.m. (108 l./min.) of air, thereby developing a filament speed of about 4,000 yd./min. (3700 m./min.) and a filament denier of 4 (0.44 tex). Before entry into the jets, the filaments are electrostatically charged by means of corona discharge devices (see Di Sabato and Owens, U.S. 3,163,753) to a level of 63,000 cgs. electrostatic units (e.s.u.) per square meter of filament surface. The output from each jet forms an area of deposition having a 4-in. (10 cm.) diameter on a foraminous belt-receiver located about 20 in. (50 cm.) below the exits of the jets. The line of jets is positioned at various angles with the direction of movement of the receiver to vary the amount of overlap between laterally-adjacent areas of deposition. A suction box with varying patterns is placed below the receiver and 400 c.f.m. (11,300 l./min.), or 26 times the total jet air, is withdrawn through the belt. Nonwoven webs are collected at receiver speeds up to 60 yd./min. (55 m./min.) and web weights of 0.5 to 3.0 oz./yd.$^2$ (17 to 102 g./m.$^2$) under conditions summarized below, consolidated between hot rolls, and then bonded with 20% by weight of a 92/6/2 terpolymer of ethyl acrylate/methyl acrylate/acrylic acid.

| Angle of Line of Jets to Direction of Movement of Receiver | Percent Overlap of Laterally-Adjacent Areas | Suction Pattern Used | Directionality Ratio [1] | | Appearance |
|---|---|---|---|---|---|
| | | | Tensile | Modulus | |
| 30° | 50 | 1 in. x 4 in. (2.5 cm. x 10 cm.) slots centered below jets.[2] | 1.2 | 1.8 | Streaky. |
| 23.5° | 60 | Diamonds between jets as in Fig. 12. | 1.1 | ---------- | Slightly streaky. |
| 19.5° | 67 | -----do----- | 1.1 | 1.1 | Good. |

[1] Properties of web, perpendicular/parallel to line of jets.
[2] Long dimension of slot in lateral direction of web.

These results show that 67% overlap of laterally-adjacent areas is necessary to form uniform webs with round jets. It has been observed that withdrawal of air at points located between the vertical axes of adjacent jets provides webs with the least directionality.

At 67% overlap, the 4 jets provide 2.67 in. (6.78 cm.) of uniform web. Each additional jet increases the web width by 1.33 in. (3.39 cm.), thus any desired web width can be made.

Example II

This example illustrates the effect of suction level on directionality of nonwoven webs produced using round jets.

Ten round jets are equipped with relaxer units, as described in Cope, U.S. 3,156,752, for treating filaments of poly(ethylene terephthalate) to develop the property of spontaneous elongatability. Each jet is supplied with 17 filaments of poly(ethylene terephthalate) and 3 filaments of a 79/21 copolymer of poly(ethylene terephthalate)/poly(ethylene isophthalate). Orientation of the filaments is effected by the tension developed by the jets using 1.9 s.c.f.m. (54 l./min.) of air to each jet. Each relaxer unit is supplied with 5.5 s.c.f.m. (156 l./min.) of air, making a total jet air flow of 74 s.c.f.m. (2100 l./min.). The temperature of the air at the exit of the relaxer units is 220° C. The filament speed is 3,500 yd./min. (3,200 m./min.) giving 3.5 denier (0.39 tex) poly(ethylene terephthalate) filaments. An electrostatic charge of 60,000 e.s.u. is induced on the filaments per square meter of filament surface.

The jets are positioned in a line with the distance from the exits of the relaxer units to the foraminous belt-receiver being 25.5 in. (65 cm.). The diameter of the areas of deposition from each jet is 4 in. (10 cm.) and the overlap of laterally adjacent areas is 67%. The suction chamber located below the receiver has a pattern as shown in FIGURE 12, with a total suction area more than twice that of the area of filament deposition. The overall width of the suction area is 8.5 in. (21.6 cm.) and the width of the intense suction areas is 2.5 in. (6.4 cm.) at the midpoints between the jets. The effect of the amount of suction air removed through the receiver is indicated in the following table for a 3 oz./yd.$^2$ (102 g./m.$^2$) web bonded in a platen press.

| Amount of Suction Air | | Ratio of Suction Air/Total Jet Air | Directionality Ratio [1] | |
|---|---|---|---|---|
| c.f.m. | l./min. | | Tensile | Modulus |
| 600 | 17,000 | 8.10 | 1.1 | 1.0 |
| 300 | 8,500 | 4.05 | 1.44 | |
| 0 | 0 | 0 | 1.84 | 1.4 |

[1] Properties of web, perpendicular/parallel to line of jets.

The coefficient of variation of web weight from the average, as measured by an alternative method to that heretofore described but which yields comparable results, for a series of webs prepared using 600 c.f.m. (17,000 l./min.) of suction air and various receiver speeds is summarized below:

| Receiver Speed | | Web Weight | | Coefficient of Variation, percent |
|---|---|---|---|---|
| yd./min. | m./min. | oz./yd. | g./m.$^2$ | |
| 6 | 5.5 | 3.0 | 102 | 6 |
| 12 | 11.0 | 1.5 | 51 | 10 |
| 18 | 16.5 | 1.0 | 34 | 15 |

Example III

This example illustrates the preparation of uniform, isotropic nonwoven webs using slot jets with 67% overlap between laterally-adjacent areas of deposition.

Using a web-laydown apparatus having a spinning position as shown schematically in FIGURE 10, poly(ethylene terephthalate) (27 relative viscosity) is spun from a spinneret with 250 holes (0.009 in. diameter x 0.012 in. long) (0.023 cm. x 0.031 cm.) at a rate of 40 lb./hr. (18.2 kg./hr.), quenched with 120 c.f.m. (3,400 l./min.) of air (18° C.) in a radial quench chimney, charged to a level of 66,000 e.s.u. per square meter of filament surface, and combined with 54 copolymer filaments on draw rolls having a surface speed of 3,620 yd./min. (3310 m./min.). The copolymer, 79/21 poly(ethylene terephthalate)/poly(ethylene isophthalate) (29 relative viscosity), is spun at a rate of 5.3 lb./hr. (2.4 kg./hr.) to give 11.7% by weight of binder in the product, and is quenched by 40 c.f.m. (1100 l./min.) of air (18° C.) in a cross-flow quench chimney. The copolymer filaments are also charged to a level of 66,000 e.s.u. per square meter of filament surface before being combined with the homopolymer filaments.

The combined ribbon of filaments is stripped from the draw rolls by a 5 in. (12.7 cm.) wide slot jet device supplied with 90 s.c.f.m. (2550 l./min.) of air. The jet device is positioned so that the long dimension of the slot is at an angle of 70.5° with the direction of movement of a foraminous belt-receiver located 19 in. (48 cm.) from the exit of the jets. The jet has a diffuser section at the exit end which spreads the ribbon of filaments to give an area of deposition which forms a 15-in. (38 cm.) wide web as the receiver moves. By combining spinning positions so that the center points of the slot jets are 15 in. (38 cm.) apart on a line 19.5° to the direction of movement of the receiver, a wide web with 67% overlap of laterally-adjacent areas of deposition is formed. With 3 positions, a 5-in. (12.7 cm.) wide uniform web, having a weight of 1.8 oz./yd.$^2$ (61 g./m.$^2$), is made at 52 yd./min. (47.5 m./min.). Each additional position adds 5 in (12.7 cm.) of uniform web, thus permitting any desired width to be obtained. The suction pattern used with this arrangement is of the type shown in FIGURE 14. The suction area is 1.8 ft.$^2$ (0.167 m.$^2$) per jet. This area is estimated to be about 4.5 times the area of filament deposition. Using 3 positions and 3,000 c.f.m. (85,000 l./min.), or 11 times the total jet air flow, a nonwoven web with a tensile-directionality ratio of 1.1 in the machine direction/transverse direction is obtained after bonding.

Example IV

This example demonstrates the formation of uniform webs using slot jets with 50% overlap between laterally-adjacent areas of deposition and the effect of amount of suction air on the directionality of the nonwoven web.

(A) Using a web-laydown apparatus having a spinning position as shown schematically in FIGURE 11, isotactic polypropylene (melt index, 4.0) is spun from a spinneret with 726 holes (0.015 in. diameter x 0.090 in. long) (0.038 cm. x 0.232 cm.) at a total throughput of 60 lb./hr. (27.3 kg./hr.), quenched with 250 c.f.m. (7100 l./min.) of air (15° C.) in a radial quench chimney, and oriented to a 3.75 draw ratio. The filament speed leaving the draw rolls is 933 yd./min. (853 m./min.). The filaments are changed to a level of 48,000 e.s.u. per square meter of filament surface.

The filaments, as a 5.5-in. (14 cm.) wide ribbon, are stripped from the last draw roll by a 6-in. (15 cm.) wide slot jet having the slot angled at 45° to the direction of travel of a foraminous belt-receiver. The jet is supplied with 110 s.c.f.m. (3100 l./min.) of air. The jet has a diffuser section at the exit end which spreads the ribbon of filaments to give a 21-in. (53 cm.) long area of deposition on the receiver which is 25 in. (64 cm.) below the jet exit. Since the long dimension of this area is angled at 45° to the direction of travel of the receiver, the lateral width of the web which is formed as the receiver moves is 15 in. (38 cm.). By combining such positions at 15-in. (38 cm.) spacing between the center points of the slot jets, a 3.5 oz./yd.$^2$ (119 g./m.$^2$) web is collected at 10 yd./min. (9 m./min.). The overlap of adjacent areas is essentially zero. The suction pattern is of the type shown in FIGURE 13, and 7.2 times the total jet air is removed by suction. The web shows very distinct streaks at the junction points of each laydown area, and the coefficient of variation of web weight is 22% (based on the weight of 1 in. x 6.5 in. (2.5 cm. x 16.5 cm.) samples of web, taken with the 6.5-in dimension in the machine direction).

(B) The apparatus in Part A is modified so that the output from each spinning position is divided between two 4-in. (10 cm.) slot jets, using 80 s.c.f.m. (2260 l./min.) of air per jet and spaced 7.5 in. (19 cm.) apart on a line angled 45° to the direction of travel of the belt-receiver. Using a diffuser section of greater divergence than in Example 4A, a web having a 15-in. (38 cm.) lateral width is collected on the receiver located 26 in. (66 cm.) below the jet exit. The overlap of laterally-adjacent areas is 50%. The suction pattern is of the type shown in FIGURE 13 and has an area of 1 ft.$^2$ (0.093 m.$^2$) per jet or about 2.5 times (est.) the area of filament deposition. No streaks are apparent in the web and the coefficient of variation of web weight is 11%. The suction level controls the directionality of the web as indicated by the data in the table below for webs which have been self-bonded by heating under restraint in a saturated steam atmosphere at 158° C.

| Amount of Suction Air | | Ratio of Suction, Air/ Total Jet Air | Directionality Ratio [1] Grab Tensile |
|---|---|---|---|
| c.f.m. | l./min. | | |
| 1,000 | 28,300 | 2.1 | 1.8 |
| 2,640 | 74,800 | 5.5 | 1.22 |
| 3,700 | 105,000 | 7.7 | 1.03 |
| 4,950 | 140,000 | 10.3 | 1.0 |

[1] Machine direction/transverse direction.

What is claimed is:
1. A process for the production of uniform, continuous-filament, non-woven webs comprising providing a plurality of substantially untwisted multifilament strands of continuous filaments, applying an electrostatic charge to the filaments, forwarding and directing the strands by means of high velocity air streams through a plurality of stationary round jet devices toward a moving formaminous receiver to form ribbons of randomly disposed filaments on the receiver corresponding to the strands issuing from each jet, the areas of initial filament deposition being offset to provide overlapping of 67 to 80% between adjacent ribbons and withdrawing air through the receiver over a suction area under the jets at a rate that is at least 5 times as great as the flow of air from the jets.

2. The process of claim 1 wherein the areas of initial filament deposition are disposed along a line making an acute angle with the direction of movement of the receiver.

3. The process of claim 1 wherein the areas of initial filament deposition are on a series of lines at right angles to the direction of movement of the receiver.

4. The process of claim 1 wherein the suction area under the jets is from about 2 to 5 times the area of initial filament deposition.

5. A process for the production of uniform, continuous filament, nonwoven webs comprising providing a plurality of substantially untwisted multifilaments strands of continuous filaments, applying an electrostatic charge to the filaments, forwarding and directing the strands by means of high velocity air streams through a plurality of stationary slot jet devices toward a foraminous receiver to form ribbons of randomly disposed filaments on the receiver corresponding to the strands issuing from each jet, the areas of initial filament deposition being offset to provide overlapping of about 50% between adjacent ribbons, and withdrawing air through the receiver over a suction area under the jets at a rate that is at least 5 times as great as the flow of air from the jets.

6. The process of claim 5 wherein the areas of initial filament deposition are disposed along a line making an acute angle with the direction of movement of the receiver.

7. The process of claim 5 wherein the areas of initial filament deposition are on at least one line at right angles to the direction of movement of the receiver, said slot jets having the long dimension of their slots angled with respect to said line.

8. The process of claim 5 wherein the suction area under the jets is from about 2 to 5 times the area of initial filament deposition.

9. A process for the production of uniform, continuous filament, nonwoven webs comprising a plurality of substantially untwisted multifilament strands of continuous filaments, applying an electrostatic charge to the filaments, forwarding and directing the strands by means of high velocity air streams through a plurality of stationary slot jet devices toward a formaminous receiver to form ribbons of randomly disposed filaments on the receiver corresponding to the strands issuing from each jet, the areas of initial filament deposition being offset to provide overlapping of about 67% between adjacent ribbons, and withdrawing air through the receiver over a suction area under the jets at a rate that is at least 5 times as great as the flow of air from the jets.

10. The process of claim 9 wherein the areas of initial filament deposition are disposed along a line making an acute angle with the direction of movement of the receiver.

11. The process of claim 9 wherein the areas of initial filament deposition are on at least one line at right angles to the direction of movement of the receiver, said slot jets having the long dimension of their slots angled with respect to said line.

12. The process of claim 9 wherein the suction area under the jets is from about 2 to 5 times the area of initial filament deposition.

13. A process for the production of uniform, continuous filament, nonwoven webs comprising providing a plurality of substantially untwisted multifilaments strands of continuous filaments, applying an electrostatic charge to the filaments, forwarding and directing the strands by means of high velocity air streams through a plurality of stationary slot jet devices toward a foraminous receiver to form ribbons of randomly disposed filaments on the receiver corresponding to the strands issuing from each jet, the areas of initial filament deposition being offset to provide overlapping of about 75% between adjacent ribbons, and withdrawing air through the receiver over a suction area under the jets at a rate that is at least 5 times as great as the flow of air from the jets.

14. The process of claim 13 wherein the areas of initial filament deposition are disposed along a line making an acute angle with the direction of movement of the receiver.

15. The process of claim 13 wherein the areas of initial filament deposition are on at least one line at right angles to the direction of movement of the receiver, said slot jets having the long dimension of their slots angled with respect to said line.

16. The process of claim 13 wherein the suction area under the jets is from about 2 to 5 times the area of initial filament deposition.

17. A process for the production of uniform, continuous filament, nonwoven webs comprising providing a plurality of substantially untwisted multifilaments strands of continuous filaments, applying an electrostatic charge to the filaments, forwarding and directing the strands by means of high velocity air streams through a plurality of stationary slot jet devices toward a foraminous receiver to form ribbons of randomly disposed filaments on the receiver corresponding to the strands issuing from each jet, the areas of initial filament deposition being offset to provide overlapping of about 80% between adjacent ribbons, and withdrawing air through the receiver over a suction area under the jets at a rate that is at least 5 times as great as the flow of air from the jets.

18. The process of claim 17 wherein the areas of initial filament deposition are disposed along a line making an acute angle with the direction of movement of the receiver.

19. The process of claim 17 wherein the areas of initial filament deposition are on at least one line at right angles to the direction of movement of the receiver, said slot jets having the long dimension of their slots angled with respect to said line.

20. The process of claim 17 wherein the suction area under the jets is from about 2 to 5 times the area of initial filament deposition.

References Cited

UNITED STATES PATENTS

| | | | |
|---|---|---|---|
| 2,993,239 | 7/1961 | Heritage | 19—156 |
| 3,296,678 | 1/1967 | Bundy et al. | 28—72 |
| 3,302,237 | 2/1967 | Cope et al. | 28—1 |
| 3,334,161 | 8/1967 | Guzman | 264—24 |
| 3,338,992 | 8/1967 | Kinney | 264—176 |

FOREIGN PATENTS 932,482   7/1963   Great Britain.

JAMES A. SEIDLECK, *Primary Examiner.*

J. R. THURLOW, *Assistant Examiner.*